March 29, 1938. E. W. FICKEN 2,112,767
FURROW DAMMING IMPLEMENT
Filed July 29, 1936 2 Sheets-Sheet 1
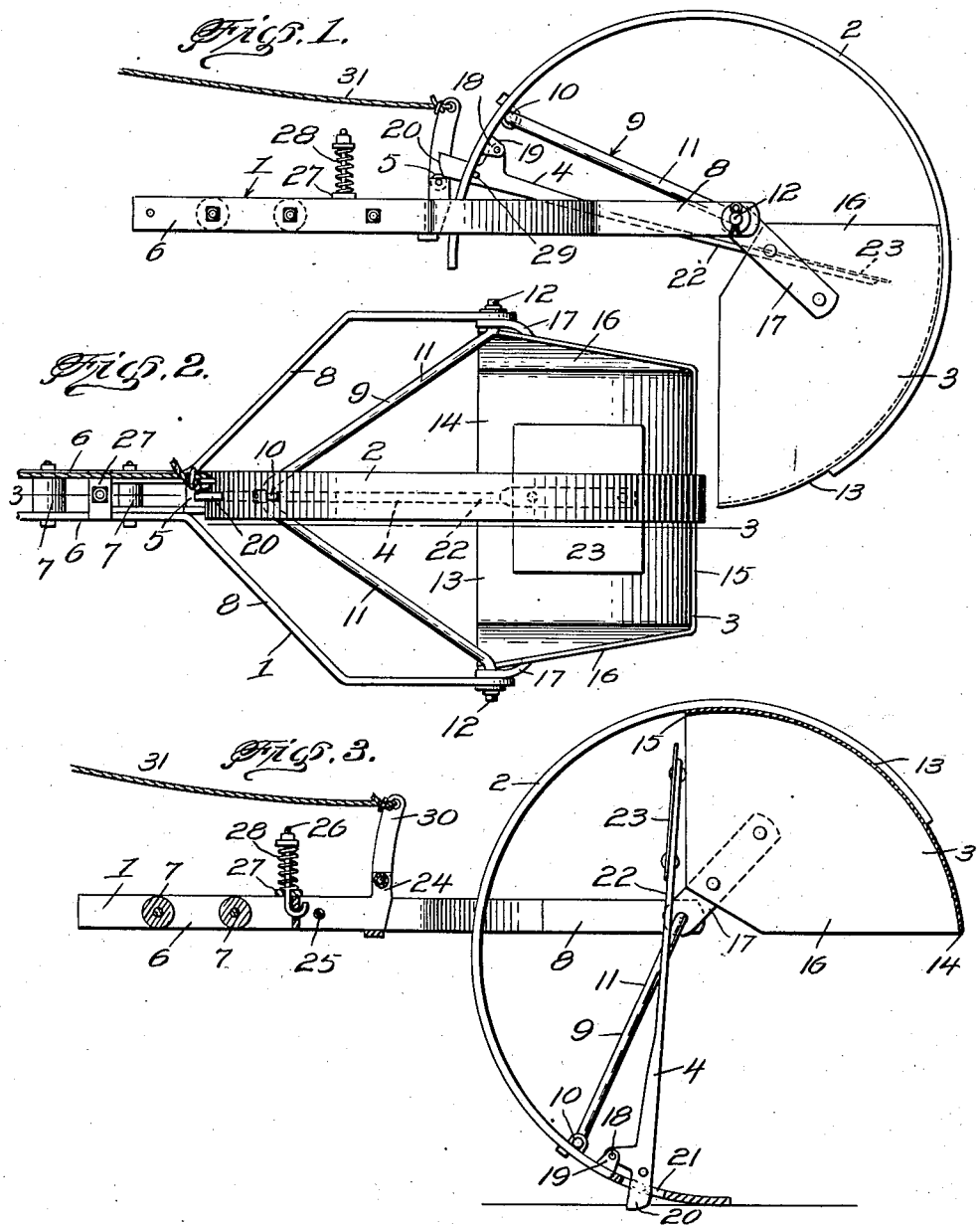
Elmer W. Ficken.
INVENTOR
BY Victor J. Evans & Co.
ATTORNEYS March 29, 1938. E. W. FICKEN 2,112,767
FURROW DAMMING IMPLEMENT
Filed July 29, 1936 2 Sheets-Sheet 2

Elmer W. Ficken, INVENTOR
BY Victor J. Evans & Co.
ATTORNEYS

Patented Mar. 29, 1938

2,112,767

UNITED STATES PATENT OFFICE 2,112,767

FURROW DAMMING IMPLEMENT

Elmer W. Ficken, Bison, Kans.

Application July 29, 1936, Serial No. 93,265

10 Claims. (Cl. 97—55)

REISSUED
FEB 4 - 1941

My invention relates to improvements in furrow damming, or blocking, implements for attachment to lister plows to block furrows during the plowing thereof.

As explanatory, in the preparation of crop land it is the practice to plow furrows or ditches by means of lister plows and to block the furrows at intervals to hold the water and soil therein and thereby obviate soil erosion.

The primary object of my invention, generally stated, is to provide a simply constructed, efficient implement for attachment to a lister plow and automatically operative to pick up earth behind the plow and to deposit same at substantially regular intervals in the furrow or ditch being plowed or replowed, as the case may be.

Still another object is to provide a device of the class and for the purpose set forth, adapted to automatically accumulate and dump substantially uniform loads of earth in the furrow and which is controlled, primarily, as regards dumping, by the accumulation of the load therein.

A more specific object is to provide an implement of the class set forth comprising a revolving scoop and an escapement mechanism for timing the revolution thereof, automatically released when the scoop has accumulated a load.

Other objects are to provide an implement for the purposes above set forth which may be readily attached to the beam of lister plows of the usual types, is light in weight, strong and durable, simple in construction and economical to manufacture.

To the accomplishment of the above, and subordinate objects presently appearing, a preferred embodiment of my invention and one modification thereof have been illustrated in the accompanying drawings, set forth in detail in the following description, and defined in the claims appended hereto.

In said drawings:

Figure 1 is a view in side elevation of the preferred embodiment of my invention, the parts being shown in normal position.

Figure 2 is a view in top plan.

Figure 3 is a view in longitudinal vertical section taken on the line 3—3 of Figure 1 with the parts shown in dumping position.

Figure 4:
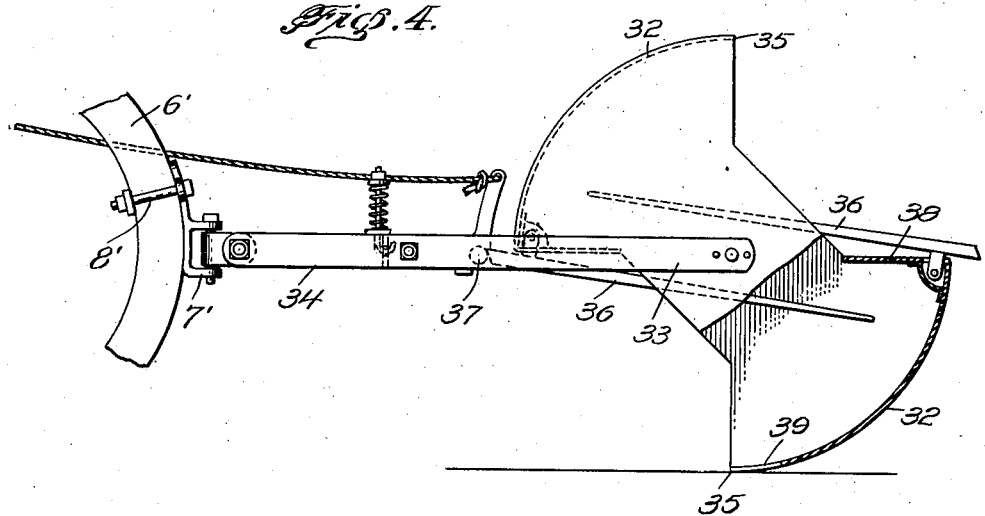
Figure 4 is a view partly in side elevation and partly in section of one modification of the invention.

Reference being had to the drawings by numerals, my improved implement, as illustrated in Figures 1 to 3, comprises a yoke-like frame 1, a segmental ground engaging shoe 2 thereon, a segmental scoop 3 mounted in the shoe 2, and an escapement mechanism comprising an escapement arm 4 and a co-operating roller 5.

The frame 1 comprises opposed front arms 6 spaced apart laterally in parallel relation, by rollers 7, and rear diverging yoke arms 8. The front arms 6 are designed to be attached to the beam 6' of a lister plow, so that the frame 1 is vertically movable thereon, as shown for instance in Figure 4, by means of a clevis 7' secured to said beam for vertical adjustment thereon by means of clips, as at 8'.

The shoe 2 comprises a narrow segmental band of suitable metal curved in the arc of a circle and rotatably mounted in said yoke arms 8 for rotation, eccentrically, about a horizontal axis transverse to said frame 1. The means for mounting the shoe 2 includes a V-shaped spider member 9 bolted at its apex, as at 10, to the inner face of the shoe 2 and forming a pair of divergent spokes 11 terminating in right-angled spindles 12 journaled in said yoke arms 8.

The scoop 3 is formed in the arc of a smaller segment than the shoe 2, and comprises a bottom wall 13 having straight front and rear edges 14 and 15, respectively, and side walls 16. The scoop 3 is secured in the shoe 2, in any suitable manner, with its bottom wall 13 centered thereon at one end of said shoe and with its front edge 13 extending through the gap between the ends of said shoe. A pair of side bars 17 secured to said side walls 16, respectively, and pivotally mounted on the spindles 12, complete the means for mounting the shoe 2 on said frame 1.

In the normal position of the shoe 2 and scoop 3, the front edge of the scoop drags on the ground in the furrow to pick up a load of earth therefrom as the implement is drawn along the furrow by the plow. The before-mentioned escapement arm 4 is pivoted, as at 18, on the inner face of the shoe 2, opposite the scoop 3, between lugs 19 on said shoe and to rock vertically in the plane of the latter. The arm 4 comprises a short front lever end 20 projecting through a slot 21 in the shoe 2 outside the latter and a rear long end 22 adapted to extend into the rear end of the scoop 3 and provided with a plate 23 secured thereto. The arm 4 is balanced on its pivot 18 so that in the normal position of the parts it extends substantially diametrically of the shoe 2 with the plate 23 disposed in the rear end of the scoop 3 and its end 20 extending over and engaging the roller 5. The roller 5 is mounted on a bracket 24 pivoted, as at 25, on the frame bars 6 to be swung into and out of the path of movement of the end 20 of the lever 4. A hooked bolt 26 vertically movable in a bracket 27 on the bar 6 and tensioned by spring 28, is operatively connected to the bracket 24 to normally retain the roller 5 in the path of movement of the end 20 of the arm 4. In this position of the roller 5 the end 22 of the arm 4 is urged about the pivot 18 in a direction opposite to that of rotation of the shoe 2. A stop pin 29 on said arm 4 engaging the shoe 2, limits rotation of the arm 4 in this direction.

When the scoop 3 has picked up a maximum load, the earth therein accumulating against the plate 23 rocks the arm 4 on its pivot 18 so that the end 20 thereof wipes past the roller 5 and releases the shoe 2 and the scoop 3. The shoe 2 is then rotated, by the drag of the front edge 14 of said scoop on the ground, until the end of the shoe 2 opposite the scoop 3 engages the ground, at which point the scoop 3 is inverted. From this point on, the shoe 2 is rotated by peripheral engagement of the same with the ground until the parts are again in the normal position previously described. During rotation of the scoop 3 to its inverted position, the earth is dumped into the furrow. If it is desired to dump the scoop while partially loaded, or in the event of failure of the arm 4 to release the same, the bracket 24 may be swung to move the roller 5 to an ineffective position. For this purpose the bracket 24 is provided with a lever arm 30 to which a cable 31 is connected for swinging said bracket 24 on its pivot 25 and disengaging the roller 5 from the end 20 of the lever 4. As before stated, the shoe 2 is eccentrically mounted. In this connection, the eccentric mounting is such that when the shoe is rotated from its normal position, the throw of the same is downward about the spindles 12. This is for the purpose of obtaining the proper leverage against the weight of the scoop to facilitate lifting the same off the ground.

Figure 5:
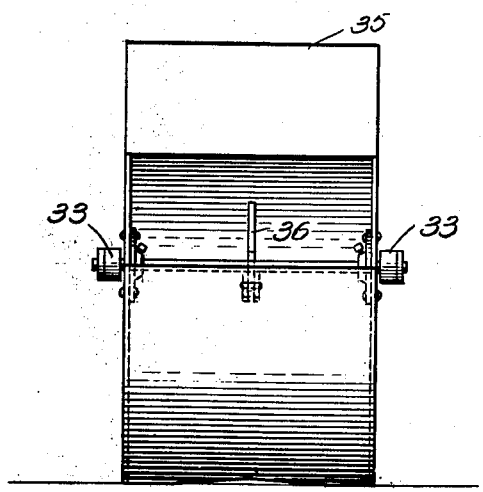
Figure 5 is a view in rear elevation of said modification.

In the modified form of the invention shown in Figures 4 and 5, the shoe feature is eliminated and a pair of segmental integral scoops 32 are mounted in diametrically opposed relation between the yoke arms 33 for rotation concentrically on the frame 34. In the normal position of the scoops 32 one or the other thereof drags on the ground with its front edge 35 foremost, the other being in a forward elevated position. A pair of escapement arms 36 are mounted on the scoops 32, respectively, for co-operation with a roller 37 to hold one or the other of said scoops, whichever the case may be, in normal ground engaging position. The operation of the escapement arms 36 and their co-operation with the roller 37 is substantially the same as described with reference to the escapement arm 4. In the operation of this form of the invention, when the one scoop 32 has accumuluated a maximum load, its escapement arm 36 is released from the roller 37 just as described with reference to the escapement arm 4. The other scoop 32 is then rotated to engage its leading edge with the ground by the drag of the first scoop, as will be understood. Under the forward travel of the scoops the second scoop is then forced into the ground to continue rotation of the scoops by a peripheral engagement therewith. In this connection it is to be noted that the escapement arms 36 are mounted on their related scoops so as to form leading ground engaging members adapted to dig into the ground and facilitate rotation of the scoop. Each scoop 32, in this instance, is provided with a rear wall 38 to prevent earth from rolling into the rear edge of the scoop as it comes down onto the surface of the ground. The front edge 35 of each scoop 33 is formed with a V-shaped notch 39 located centrally thereof nd breaking the continuity of said front edge. The purpose of these notches is to prevent the scoop 32 from picking up seed, as for instance when the lister to which they are attached is being used in planting.

The foregoing detailed explanation will, it is believed, suffice to impart a clear understanding of my invention. The details described are, however, to be understood as illustrative rather than restrictive, and right is herein reserved to modifications thereof falling within the scope of the claims appended hereto.

What I claim is:

1. In an implement of the class described, a frame, a segmental scoop having a front edge and revolubly mounted in said frame for rolling contact with the ground and to present said edge to the ground in scraping position to thereby accumulate a load in said scoop, and means to lock said scoop in said position, said means including means projecting interiorly of the scoop for engagement with the material therein to thereby release said locking means.

2. In an implement of the class described, a frame, a segmental scoop having a front edge and revolubly mounted in said frame for rolling contact with the ground and to present said edge to the ground in scraping position to thereby accumulate a load in said scoop, and escapement devices for locking said scoop in said position and comprising, an abutment member on said frame, and a pivoted escapement arm on said scoop revolved by the latter into engagement with said abutment and movable about its pivot to disengaging position by the accumulation of a load in said scoop.

3. In an implement of the class described, a frame, a segmental scoop having a front edge and revolubly mounted in said frame for rolling contact with the ground and to present said edge to the ground in scraping position to thereby accumulate a load in said scoop, and escapement devices for locking said scoop in said position and comprising, a roller on said frame, a pivoted escapement arm on said scoop revolved by said shoe into engagement with said roller and movable about its pivot to disengaging position by the accumulation of a load in said scoop, said roller being mounted on the frame for movement into and out of effective positions, and manipulative means for moving said roller.

4. In an implement of the class described, a frame, a segmental shoe rotatably mounted therein for rolling contact with the ground, a scoop secured in said shoe at one end thereof and having a front edge parallel with the axis of rotation of said shoe, and means to lock said shoe against rotation with said edge of the scoop in ground engaging position to accumulate a load in said scoop and comprising, co-engaging escapement devices disengaged by the accumulation of a load in said scoop.

5. In an implement of the class described, a frame, a segmental shoe rotatably mounted therein for rolling contact with the ground, a scoop secured in said shoe at one end thereof and having a front edge parallel with the axis of rotation of said shoe, means to lock said shoe against rotation with said edge of the scoop in ground engaging position to accumulate a load in said scoop and comprising, co-engaging escapement devices disengaged by the accumulation of a load in said scoop, and manipulative means for disengaging said devices at will.

6. In an implement of the class described, a frame, a segmental shoe rotatably mounted therein for rolling contact with the ground, a scoop secured in said shoe at one end thereof and having a front edge parallel with the axis of rotation of said shoe, and escapement mechanism to lock said shoe against rotation with said edge of the scoop in ground scraping position to accumulate a load in said scoop, said mechanism comprising, a pivoted escapement arm on said shoe movable to an escapement disabling position by the accumulation of a load in said scoop.

7. In an implement of the class described, a frame, a segmental shoe rotatably mounted therein for rolling contact with the ground, a scoop secured in said shoe at one end thereof and having a front edge parallel with the axis of rotation of said shoe, and means to lock said shoe against rotation with said edge of the scoop in ground engaging position to accumulate a load in said scoop and comprising, a roller on said frame, a pivoted escapement arm on said shoe revolved by the latter into engagement with said roller and movable on its pivot to disengaged position by the accumulation of a load in said scoop.

8. In an implement of the class described, a frame, a segmental shoe rotatably mounted therein for rolling contact with the ground, a scoop secured in said shoe at one end thereof and having a front edge parallel with the axis of rotation of said shoe, and escapement mechanism to lock said shoe against rotation with said edge of the scoop in ground scraping position to accumulate a load in said scoop, said mechanism comprising, an abutment member on said frame, and a pivoted escapement arm on said shoe having a plate at one end thereof and revolved by the shoe to engage the abutment and to position said plate in overlying relation to a load being accumulated in said scoop, whereby said arm is disengaged by the accumulation of said load.

9. In an implement of the class described, a frame, a segmental shoe rotatably mounted therein for rolling contact with the ground, a scoop secured in said shoe at one end thereof and having a front edge parallel with the axis of rotation of said shoe, escapement mechanism to lock said shoe against rotation with said edge of the scoop in ground scraping position to accumulate a load in said scoop, said mechanism comprising, an abutment member on said frame, a pivoted escapement arm on said shoe having a plate at one end thereof and revolved by the shoe to engage the abutment and to position said plate in overlying relation to a load being accumulated in said scoop, whereby said arm is disengaged by the accumulation of said load, said abutment being movable to ineffective position relative to said arm, and manipulative means for moving said abutment.

10. In an implement of the class described, a travelling frame, a segmental ground engaging shoe rotatably mounted in said frame, a scoop mounted in said shoe at one end thereof and having a front edge parallel with the axis of rotation of said shoe and projecting beyond said end thereof, and releasable scoop holding means having a portion thereof projecting interiorly of the scoop when in holding position for engagement with the material accumulated by said scoop to thereby automatically release said scoop when a predetermined quantity of material has accumulated in said scoop, said holding means being so constructed as to lift said scoop when said holding means is in released position and said scoop is discharging said material.

ELMER W. FICKEN.